United States Patent [19]

Kawahard

[11] 4,405,139

[45] Sep. 20, 1983

[54] BOARDS FOR SLIDING ON SNOW

[76] Inventor: Kuniaki Kawahard, 5-8, Sakuragaokar, 4-Chome, Setagaya-ku, Tokyo, Japan

[21] Appl. No.: 253,769

[22] PCT Filed: Jan. 5, 1979

[86] PCT No.: PCT/JP79/00002

§ 371 Date: Sep. 5, 1980

§ 102(e) Date: Aug. 26, 1980

[87] PCT Pub. No.: WO80/01371

PCT Pub. Date: Jul. 10, 1980

[51] Int. Cl.³ .............................................. B62B 17/00
[52] U.S. Cl. ................... 280/12 H; 441/74; 441/79
[58] Field of Search .............. 280/12 H, 16, 600, 609, 280/601, 18, 28, 12 AA, 602, 87.04 A; 9/310 E, 310 D, 310 A; 2/269, 335, 338; 36/122; D21/227, 228, 229; 441/74, 79, 65, 68

[56] References Cited

U.S. PATENT DOCUMENTS

| 2,153,939 | 4/1939 | Schaupp | 9/310 D |
| 3,378,275 | 12/1968 | Carreiro | 280/18 |
| 3,401,949 | 9/1968 | Fouillett | 280/11.13 |
| 3,534,972 | 10/1970 | Salerno | D21/229 X |
| 3,579,681 | 5/1971 | Pope et al. | 9/310 E |
| 4,241,929 | 12/1980 | Curry | 280/12 H |

FOREIGN PATENT DOCUMENTS

| 133169 | 12/1932 | Austria | 280/600 |
| 946864 | 5/1974 | Canada | 280/12 H |
| 37-1320 | 5/1962 | Japan . | |
| 49-105275 | 9/1974 | Japan . | |
| 51-66044 | 6/1976 | Japan . | |
| 51-129373 | 10/1976 | Japan . | |

Primary Examiner—Robert J. Spar
Assistant Examiner—Donald W. Underwood
Attorney, Agent, or Firm—Wegner, McCord, Wood & Dalton

[57] ABSTRACT

A board for sliding on snow is provided and has nose, intermediate and tail portions. The nose and tail portions have a thickness that will not deform under the weight of a user. The intermediate portion has a thickness that it will elastically bend under the weight of a user. The board is shaped into an inverted arch and has a side plate mounted on each of the side edges to extend longitudinally thereof. Step-decks for the user's stance are located on the respective connections between the nose and intermediate portions and between the intermediate and tail portions with the step-decks being inclined downwardly toward the intermediate portion. The tail portion has at least one pin tail configuration and includes a fin-box embedded at the bottom of said pin tail. The fin-box includes a fin which is detachably mounted therewithin such that the fin will be released when a force is applied thereto that is stronger than a predetermined level. Releasable binding members are provided at each step deck to retain the user's feet on the board.

6 Claims, 13 Drawing Figures

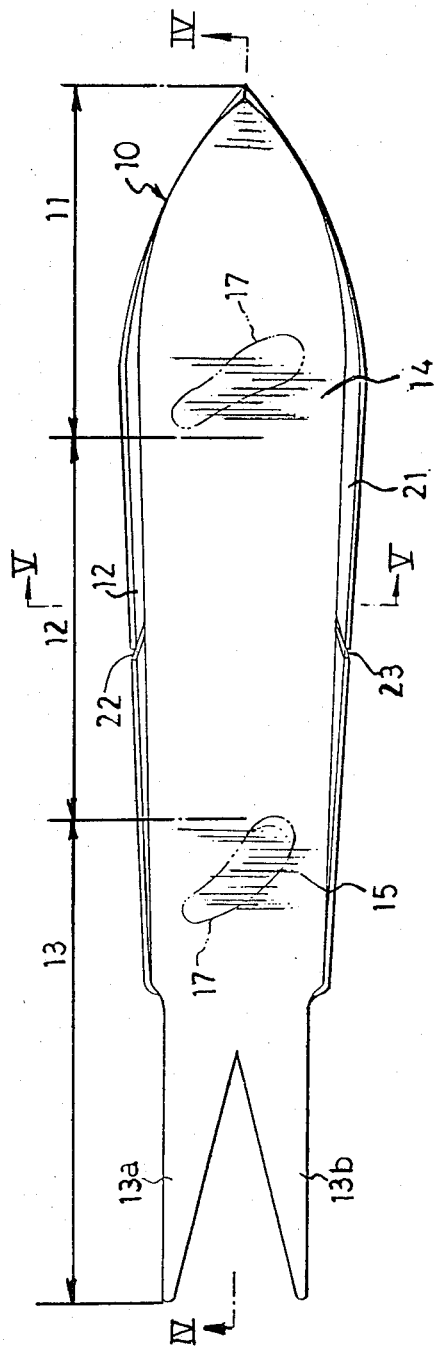
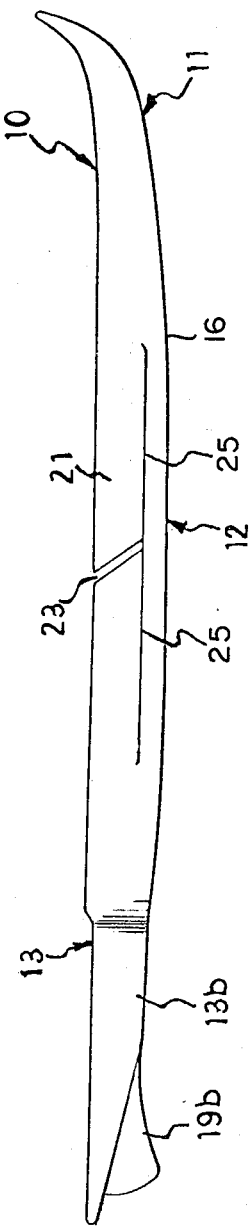

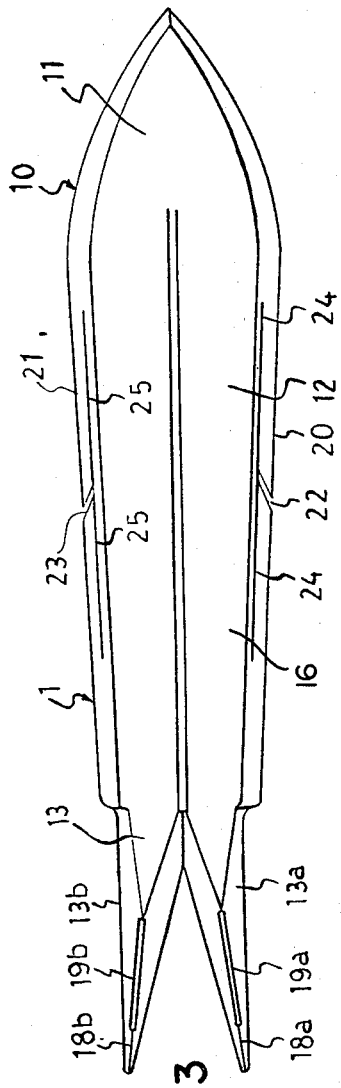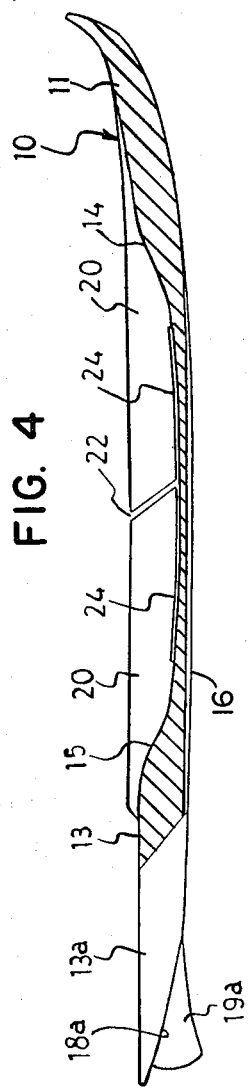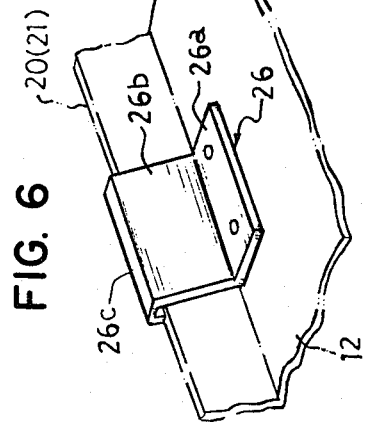

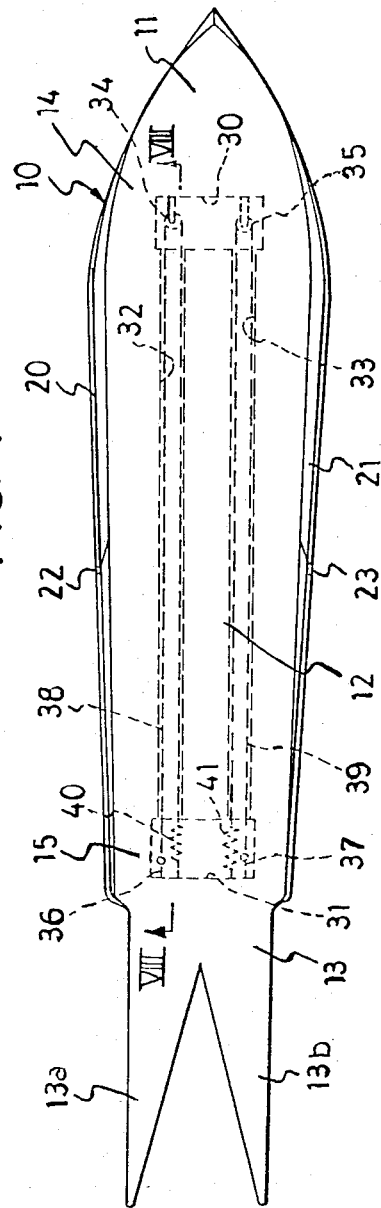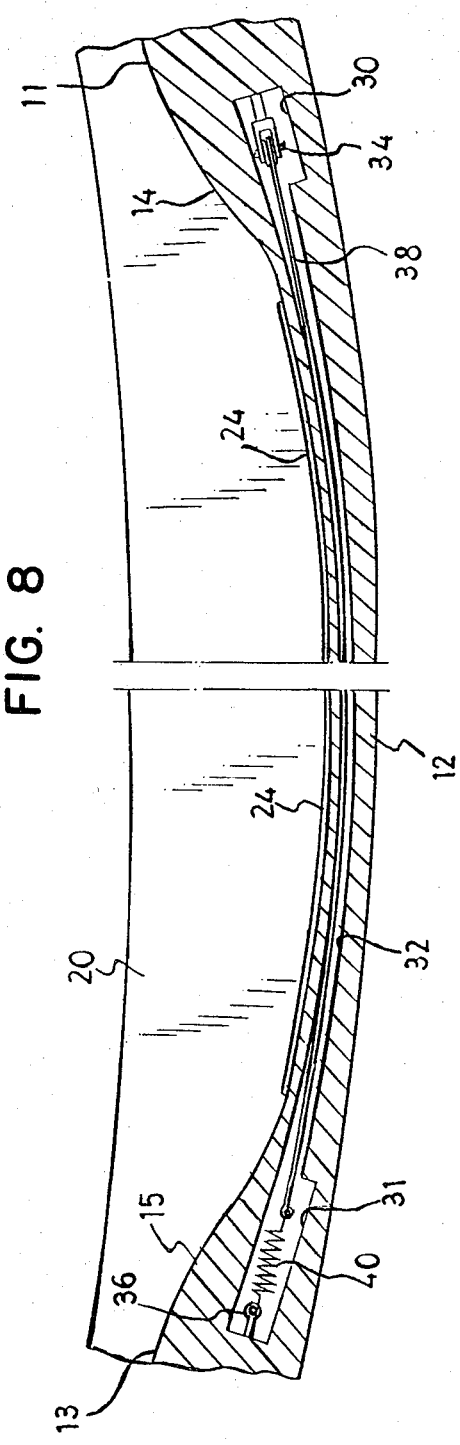

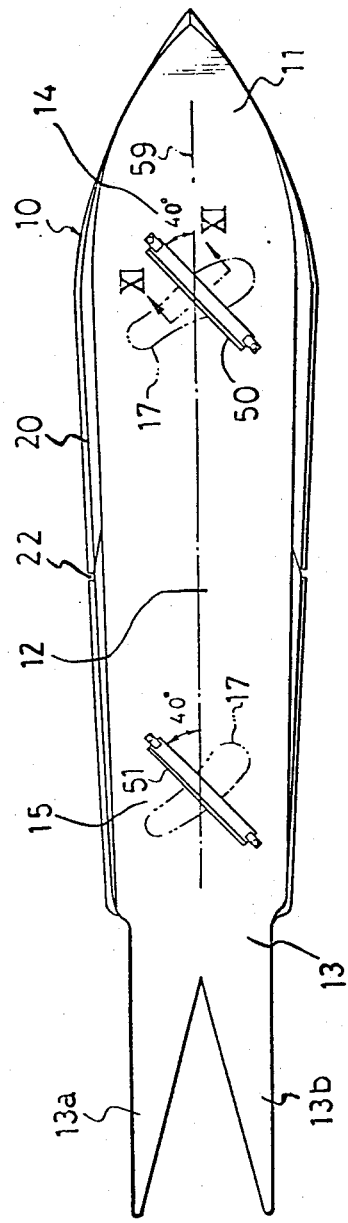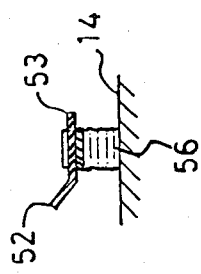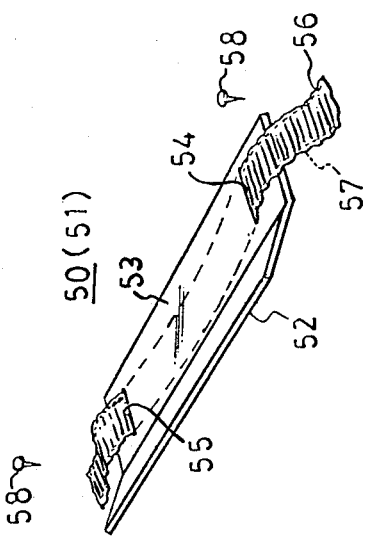

BOARDS FOR SLIDING ON SNOW

FIELD OF THE ART

This invention relates to a board which freely slides on the snow. More particularly, this invention concerns an athletic apparatus consisting of a board which comprises a body having two step-decks spaced away from each other lengthwise, the board being used by a player such that he will slide on the snow while balancing his legs on the step-decks.

In order to efficiently slide on the surface of the snow, it is required that the player's weight be uniformly distributed over the surface of the resilient board which is contacted by the snow. For the same reason, a ski includes nose-bends and tail-bends which will contact a flat floor when the ski is placed thereon, the intermediate ski portion between the nose-bend and tail-bend being curved upwardly from the floor to form an arched bend. The nose-bends and tail-bends of the ski are smaller in thickness than the intermediate arched portion. When the weight of a skier is placed on the intermediate portion of the ski, the thin walls of the ski are bent to contact the whole bottom with the surface of the snow so that the skier's weight is uniformly distributed over the entire ski.

It is an object of this invention to provide a board for sliding on the snow which is used such that a player balances his legs on the board at two positions spaced away from each other lengthwise, said board including forward and rearward portions and an intermediate resilient portion which is smaller in thickness than the forward and rearward portions to form an inverted arch bend so that when the player's weight is exerted on the forward and rearward portions of the board it is uniformly distributed over the whole bottom of the board contacted by the snow, thereby obtaining efficient sliding effect on the snow.

Another object of this invention is to provide a board of the above type which includes nose and tail portions having step-decks, each of the step-decks being inclined downwardly toward said intermediate portion so that the bending of the intermediate portion will accommodate itself to the curvature of the surface of the snow and also so that the player can easily balance himself on the board.

Another object is to provide a board of the above type which includes a double tail (so-called "swallow's tail") with fins mounted on the respective tails so that the board will be slid from its balance.

Another object is to provide a board of the above type in which said fins are detachably mounted on the tails of the board.

Another object is to provide a board of the above type which includes side plates provided along the side edges thereof to improve mobility of the board on sliding.

Another object is to provide a board of the above type which includes bindings on the step-decks to anchor the player's feet to the board.

Still another object is to provide a board of the above type which includes spring means located within the board to increase the resiliency in the intermediate portion of the board, to decrease the weight of the board, and to prevent the board from losing its efficiency due to aging.

The above objects, features, and advantages will become more apparent from the embodiments of the invention illustrated in the accompanying drawings.

BRIEF DESCRIPTION OF THE DRAWINGS

FIG. 1 is a plan view showing a basic structure of a board for sliding on snow which is constructed in accordance with this invention;

FIG. 2 is a side view of the board shown in FIG. 1;

FIG. 3 is a bottom view of the board shown in FIG. 1;

FIG. 4 is a sectional view taken along a line IV—IV of FIG. 1;

FIG. 5 is a sectional view taken along a line V—V of FIG. 1;

FIG. 6 is a perspective view showing a metal fitting for reinforcing the side plate of the board;

FIG. 7 is a plan view of a board constructed according to this invention, in which spring means are located within the board to increase the resiliency in the intermediate portion of the board;

FIG. 8 is an enlarged, sectional view taken along a line VIII—VIII of FIG. 7;

FIG. 9 is a plan view of a board constructed according to this invention which includes a pair of bindings located thereon;

FIG. 10 is a perspective view showing, in an enlarged scale, one of the bindings shown in FIG. 9;

FIG. 11 is an enlarged, sectional view taken along a line XI—XI of FIG. 9;

FIG. 1 shows the basic structure of a board for sliding on snow, constructed in accordance with this invention. Such a basic structure comprises a board body (10) made of wood FRP (fiber reinforced plastic) or the like which generally includes a nose portion (11), an intermediate portion (12) and a tail portion (13). The overall length of the board body (10) is about 150 cm, but is not limited to such a length. The length of the board is determined by the height and weight of the user or by the required speed of sliding. The nose and tail portions (11), (13) are of such a thickness that they will not be easily deformed as the user's weight is exerted on the board, for example, about 4 cm thick. On the other hand, the intermediate portion (12) is of a thickness sufficiently smaller than that of the nose or tail portion to bend easily, for example, about 0.6 cm to 1.5 cm. The connection between the intermediate and nose portions (12), (11) includes a step-deck (14) formed to incline upwardly toward the nose portion (11), and the connection between the intermediate and tail portions (12), (13) also includes a step-deck (15) formed to incline upwardly toward the tail portion 13.

Figure 12:
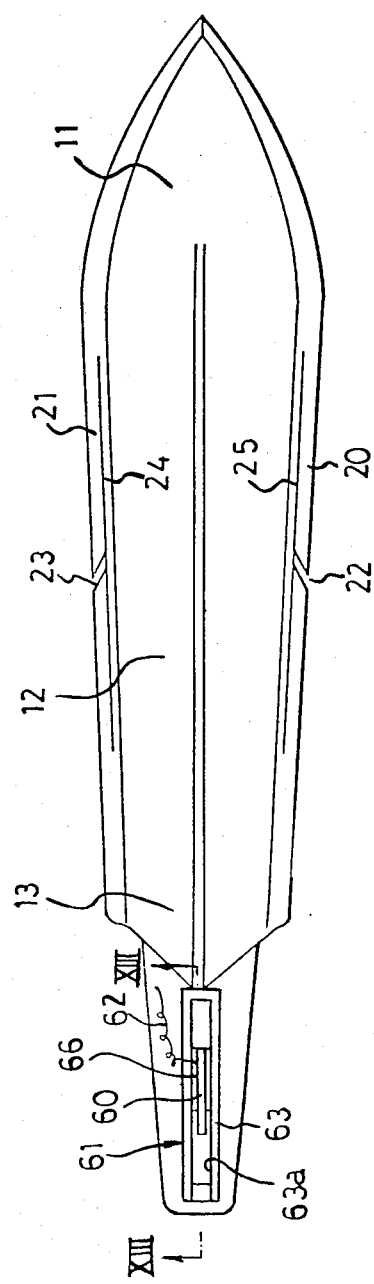
FIG. 12 is a bottom view of a board which is a further embodiment of this invention, including another fin arrangement.

The board body (10) includes a flat bottom (16) adapted to contact the surface of snow, as shown in FIGS. 3 and 5, and is of an inverted arch shape as shown in FIGS. 2 and 4 contrary to conventional skis. Namely, it is curved toward the surface of snow downwardly, as shown in FIG. 4.

When the weight of a user is placed on the board body (10) by positioning his left and right feet (17) on the respective step-decks (14) and (15) as shown by chain lines in FIG. 1, the resilient, thin intermediate portion (12) is bent into a flat plate with the bottom contacted uniformly by the surface of snow so that the user's weight will be equally distributed over the board body (10). Such an adjustment also permits the board to efficiently slide on the snow just like conventional skis.

When the board is slid on the snow by the user, the curvature thereof is varied in accordance with the irregularity of the snow surface. At this time, the user's legs should be placed on the inclined step-decks (14) and (15) so that the board can be controlled to follow the irregularity of the snow. Further, the speed of the sliding board changes in accordance with the irregularity of the snow surface, the properties of the snow or the like. When the speed of the sliding board decreases abruptly, the user can support himself by placing his foot on the forward step-deck (14) countering the inertia force. When the speed increases suddenly, the user can similarly support himself by placing his foot on the rearward step-deck (15) against the intertia force. This can be easily accomplished by the user due to the fact that the board body (10) includes both forward and rearward inclined step-decks (14) and (15) as shown in FIG. 4.

The nose portion (11) of the board body (10) includes a pointed tip curved upwardly as in conventional skis. The tail portion (13) includes two pin-tails (13a) and (13b) as seen from FIGS. 1 and 3, and is generally called a "swallow's tail." Each of the pin-tails (13a) and (13b) in a cross-sectional view form an inverted triangle, the bottom edge of which (18a) or (18b) includes a fin (19a) or (19b). Thus, the nose portion (11) of the board can be easily moved upwardly when the user's weight is shifted to the tail portion (13). At the same time, the pin-tails (13a) and (13b) are pressed against the surface of the snow so that the yawing of the sliding board can be decreased stabilizing the board on the snow. Moreover, the fins (19a) and (19b) serve as a steering means since they penetrate into the snow.

The board body (10) also includes, as shown in FIG. 1, side plates (20) and (21) mounted on the side edges of the board body (10) and extending longitudinally along the nose portion (11), the intermediate portion (12) and a part of the tail portion (13). Each of the side plates (20) and (21) has a height of about 4 cm as measured at the intermediate portion (12) and is outwardly inclined with respect to the upper face of the intermediate portion (12) at an angle of about 120 degrees, as seen from FIG. 5. If the user's weight is laterally shifted by placing one of his feet on either the right or left side plate, the board body (10) can be heeled while sliding. In an extreme case, the board can be slid on only one of the side plates (20) and (21). This allows the user to turn the board to the desired direction.

Each of the side plates (20) and (21) includes a slit (22) or (23) located at the middle of the intermediate portion (12) and slanting across the width of the corresponding side plate to the top edge thereof, as best seen from FIG. 4. Each of the side plates also includes a longitudinal slit (24) or (25) extending from the bottom end of the slit (22) or (23) toward the nose and tail portion (11) and (13) along the side edge of the intermediate portion (12). These slits (22)–(25) permit the board body (10) to bend elastically at the intermediate portion (12) thereof.

As shown in FIG. 6, metal reinforcing fittings (26) are mounted on the inside of the side plates (20) and (21) at the slits (22) and (23) and affixed to the board body (10) by any suitable fastening means. This is for the purpose of reinforcing the weakened structure of the board in the presence of the slits (22)–(25), preventing the side plates from jamming at the slits, and avoiding any undesirable bending of the board body (10). Each of the fittings (26) includes: a mount portion (26a) for securing the fittings to the intermediate portion (12) of the board, a reinforcing portion (26b) contacting the inner face of the side plate (20) or (21), and a channel portion (26c) engaged at the upper edge of the side plate.

In conventional skis and surf-boards, decreasing the weight increases the operability thereof so long as the strength will hold. This is because a lighter ski or surfboard can be more easily handled by a player. It is now known in the art that the lightest surf-board has a weight of about 3 kg, and the lightest surf-board can float on water. For the same reason, it is desirable that this invention also provides lighter boards for sliding on snow. When the intermediate portion (12) of the board is thin-walled so far as the strength thereof permits, the resiliency is decreased adversely affecting the sliding performance. FIGS. 7 and 8 illustrate another embodiment of this invention which overcomes the above problem.

In FIGS. 7 and 8, board body (10) is substantially of the same configuration as that of the previous embodiment as shown in FIGS. 1 to 6 except that the intermediate portion (12) of the board is made as thin as possible thus decreasing the weight of the board. Therefore, the parts are indicated by using reference numerals similar to those of FIGS. 1 to 6. Only the structural parts which are different from those in the previous embodiment will be described.

The board body (10) includes a nose portion (11) in which a cavity (30) is positioned immediately below the forward step-deck (14). The tail portion (13) also includes a cavity (31) positioned immediately below the rearward step-deck (15). The intermediate portion (12) includes a pair of parallel passages (32) and (33) which connect said cavities (30) and (31). The cavity (30) includes two small pulleys (34) and (35) disposed at the ends of respective passages (32) and (33), while the cavity (31) includes two hooks (36) and (37) disposed similarly therein. Wire (38) or (39) is connected at one end to the respective hook (36) or (37) in one of the cavities and extends through the respective passage (32) or (33) to the other cavity (30) in which the wire (38) or (39) passes around the respective pulley (34) or (35) and then through the passage (32) or (33) to the cavity (31). The opposite end of the wire (38) or (39) is connected by means of coil spring (40) or (41) to the inside of cavity (31). In such an arrangement, the wires (38) and (39) are held in tension by the coil springs (40) and (41) so that the intermediate portion (12) of the board tends to be bent upwardly, that is, in the direction of the inverted arch bend. The coil springs (40) and (41) will resist the bending of the board in a direction opposite to the inverted arch bend. Thus, the resiliency in the intermediate portion (12) can be increased by the action of the coil springs (40) and (41). Moreover, the resiliency can be covered by the coil springs (40) and (41) even it is decreased due to the effect of aging.

While a means to increase resiliency comprising the pair of springs and the pair of wires has been described in connection with FIGS. 7 and 8, it is to be understood that one or more sets of such combinations can be utilized in accordance with this invention.

FIG. 9 shows still another embodiment of this invention in which two bindings (50) and (51) are mounted on the forward and rearward step-decks (14) and (15) of the board body (10). Each of the bindings (50) and (51) is disposed at an angle of about 40 degrees relative to a longitudinal center line (59) of the board body (10). The binding (50) or (51) comprises, as best seen from FIG. 10, a shoe-holding plate (53) including a slant portion (52) formed at the forward edge thereof for facilitating insertion of the shoe and slots (54) and (55) formed in the shoe-holding plate (53) at the opposite ends thereof. Inserted into slots (54) and (55) is a rubber tape (57) covered by a sleeve-like cloth (56), the opposite ends of which are anchored on the board body (10) by any suitable fastening means such as bolts (58) or the like. In this way, the bindings (50) and (51) can be mounted on the board body (10). As seen from FIG. 11, the shoe-holding plate (53) is positioned above the surface of the board body (10) by a distance of about 3 cm. Thus, the shoe can be easily moved in and out of the space between the shoe-holding plate and the surface of the board. Since the bindings are positioned slantwise with respect to the longitudinal center line (59), the user's feet or shoes can be shifted relatively freely in all directions so that the user's body will be conveniently balanced on the board surface while sliding. It is further preferred that the sleeve-like cloth (56) is about 3 cm longer than the rubber tape (57). Therefore, the rubber tape (57) can be prevented from extending beyond the length of the sleeve-like cloth (56) so that the user's shoes will not slip out of the bindings upon jumping. It is also to be understood that when the right foot of the user is positioned on the forward step-deck (14) and the left foot is on the rearward step-deck (15), the bindings (50) and (51) will be oriented in a position shifted angularly through 90 degrees from a position shown in FIG. 10.

FIG. 12 shows a further embodiment of this invention in which a fin is detachably mounted on the tail portion (13) of the board body (10) at the bottom thereof.

In FIG. 12, the fin (60) is detachably mounted on the bottom of the tail portion (13) through a fin-box (61). The fin (60) is also connected with the board body (10) by means of a string (62) such that the fin (60) will not separate from the board body (10) even if the fin accidentally disconnects from the fin-box (61).

Figure 13:
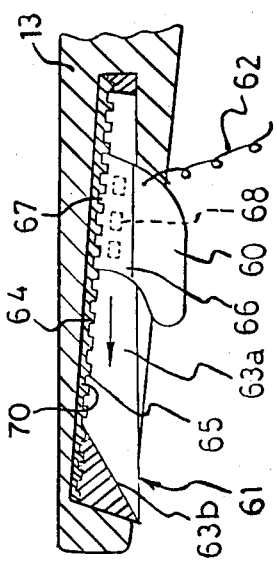
FIG. 13 is an enlarged, sectional view taken along a line XIII—XIII of FIG. 12.

FIG. 13 illustrates in more detail the connection between the fin (60) and the fin-box (61), in which the fin-box (61) includes a rectangular frame (63) having top and bottom openings and four sidewalls. These sidewalls define a slot (63a) which decreases in depth toward the front end of the board body (10). The fin-box (61) is seated in a groove (70) in the tail portion (13) with the groove (70) increasing in depth as the rear extremity of the tail portion (13) is approached. The groove (70) and fin-box (61) combine to increase the distance from the bottom (plate 64) of the fin-box (61) to the plane of the bottom of the board as the rear extremity of the tail portion (13) is reached. The top opening is covered by a plate (64) made of any suitable magnetic material the bottom of which plate includes a plurality of teeth (65) defined by a plurality of grooves. Each of the grooves has a depth of 2 mm and a width of 5 mm, for example. It is thus to be understood that the fin-box (61) is embedded underneath the tail portion (13) with the fin-box opening downwardly. The upper portion (66) of the fin (60) has such a thickness that the fin will slide within the slot (63a) of the fin-box (61). The upper portion (66) also includes a plurality of teeth formed at the top edge thereof adapted to engage with the teeth (65) on the metal plate (64). Within the upper portion (66) of the fin (60) there are embedded permanent magnets (68) for holding the fin to the metal plate (64) under magnetic attraction.

If an excessive force is exerted on the fin (60) due to any obstruction upon sliding, the fin (60) would be forced within the slot (63a) in a direction as shown by an arrow in FIG. 13, despite the magnetic attraction of the permanent magnets (68) and the engagement of the teeth (65), (67). It is thus apparent that the projection of the fin (60) from the fin-box (61) will be decreased as the depth of the slot (63a) increases toward the rearward end thereof. Therefore, the fin (60) generally can be released from the obstruction. Notwithstanding, if the fin is not released from the obstructions, it would be forced to the rearward end of the slot (63a) so that the fin (60) would ride on the slope (63b) formed in the rearward end of the slot (63a) and disengage therefrom. The string (62) permits the disengaged fin to stay connected to the board body (10). In such an arrangement, the board body (10) will not be damaged by any obstruction below the snow. When the fin (60) is positioned at or adjacent to the forward portion of the fin-box, the board can be operated by the user with a smaller radii of turn. Such a position of the fin is particularly useful for sliding on a steep slope with deep snow or a slope with sticky snow. When the fin is positioned at or adjacent to the rearward portion of the fin-box, the user can enjoy high-speed slidings on the snow. This is particularly useful for sliding on a slope with frozen snow. If the fin is not wanted, it can be removed from the board body by disconnecting the string.

While some preferred embodiments of the invention have been described in connection with the accompanying drawings, many changes may be accomplished without departing from the true scope of the invention.

I claim:

1. Board for sliding on snow, comprising a board body which includes nose, intermediate and tail portions, each of said nose and tail portions having such a thickness that it will not be deformed by the weight of a user placed thereon, said intermediate portion having such a thickness that it will be elastically bent by the user's weight, said board body being shaped into an inverted arch bend; a side plate mounted on each of the side edges of said board body to extend longitudinally thereof; and step-decks for the user's stance which are located on the respective connections between said nose and intermediate portions and between said intermediate and tail portions, said step-decks being inclined downwardly toward said intermediate portion; said tail portion having at least one pin tail configuration: characterized in that said pin tail includes a fin-box embedded therein at the bottom of said pin tail, said fin-box including a fin which is detachably mounted therewithin such that the fin will be released when a force is applied thereto that is stronger than a predetermined level.

2. Board for sliding on snow, comprising a board body which includes nose, intermediate and tail portions, each of said nose and tail portions having such a thickness that it will not be deformed by the weight of a user placed thereon, said intermediate portion having such a thickness that it will be elastically bent by the user's weight, said board body being shaped into an inverted arch bend; a side plate mounted on each of the side edges of said board body to extend longitudinally thereof; and step-decks for the user's stance which are located on the respective connections between said nose and intermediate portions and between said intermediate and tail portions, said step-decks being inclined downwardly toward said intermediate portion: characterized in that said tail portion includes a fin-box including a fin which is detachably mounted therewithin such that the fin will be released when a force is applied thereto stronger than a predetermined level, said fin protruding less from said fin-box as said fin is moved rearwardly within said fin-box.

3. Board for sliding on snow, comprising a board body which includes nose, intermediate and tail portions, each of said nose and tail portions having such a thickness that it will not be deformed by the weight of a user placed thereon, said intermediate portion having such a thickness that it will be elastically bent by the user's weight, said board body being shaped into an inverted arch bend; a side plate mounted on each of the side edges of said board body to extend longitudinally thereof; and step-decks for the user's stance which are located on the respective connections between said nose and intermediate portions and between said intermediate and tail portions, said step-decks being inclined downwardly toward said intermediate portion: characterized in that said tail portion includes a fin-box embedded therein at the bottom of said tail portion, said fin-box including a fin which is detachably mounted therewithin such that the fin will be released when a force is applied thereto that is stronger than a predetermined level, and in that said board further includes means for mounting said fin within said fin-box, said mounting means including a plurality of teeth formed in said fin-box along the length thereof, a plurality of corresponding teeth formed in said fin at the surface thereof which is adapted to engage with said teeth in said fin-box, and permanent magnet means embedded in said fin for attaching said fin to said fin-box.

4. Board for sliding on snow, comprising a board body which includes nose, intermediate and tail portions, each of said nose and tail portions having such a thickness that it will not be deformed by the weight of a user placed thereon, said intermediate portion having such a thickness that it will be elastically bent by the user's weight, said board body being shaped into an inverted arch bend; a side plate mounted on each of the side edges of said board body to extend longitudinally thereof; and step-decks for the user's stance which are located on the respective connections between said nose and intermediate portions and between said intermediate and tail portions, said step-decks being inclined downwardly toward said intermediate portion; said tail portion being shaped into a double-pin tail configuration: characterized in that each of said step-decks include binding means mounted slantwise thereon, said binding means comprising a shoe-holding plate having slots formed therein, a rubber tape passing through said slots and having the opposite ends thereof anchored to the corresponding step-deck, and a sleeve-like cloth covering said rubber tape along the length thereof, said sleeve-like cloth having a length larger than that of said rubber tape.

5. Board for sliding on snow, comprising a board body which includes nose, intermediate and tail portions, each of said nose and tail portions having such a thickness that it will not be deformed by the weight of a user placed thereon, said intermediate portion having such a thickness that it will be elastically bent by the user's weight, said board body being shaped into an inverted arch bend; a side plate mounted on each of the side edges of said board body to extend longitudinally thereof; and step-decks for the user's stance which are located on the respective connections between said nose and intermediate portions and said intermediate and tail portions, said step-decks being inclined downwardly toward said intermediate portion; said tail portion being shaped into a double-pin tail configuration; characterized in that each pin-tail defining said double-pin tail configuration is of a tapered trigonal pyramid configuration.

6. Board for sliding on snow, comprising a board body which includes nose, intermediate and tail portions, each of said nose and tail portions having such a thickness that it will not be deformed by the weight of a user placed thereon, said intermediate portion having such a thickness that it will be elastically bent by the user's weight, said board body being shaped into an inverted arch bend; a side plate mounted on each of the side edges of said board body to extend longitudinally along said nose portion, said intermediate portion and a part of said tail portion, each of said side plates being inclined upwardly from the corresponding side edge of the top surface of said board body; step-decks for the user's stance which are located on the respective connections between said nose and intermediate portions and between said intermediate and tail portions, said step-decks being inclined downwardly toward said intermediate portion; and said tail portion being shaped into a double-pin tail configuration which includes pin-tails of a tapered trigonal pyramid configuration.

* * * * *